US012783820B2

(12) United States Patent
Wu

(10) Patent No.: US 12,783,820 B2
(45) Date of Patent: Nov. 3, 2026

(54) INFORMATION PROCESSING METHOD, APPARATUS, DEVICE, MEDIUM, AND PRODUCT BASED ON LARGE MODEL

(71) Applicant: BEIJING BAIDU NETCOM SCIENCE TECHNOLOGY CO., LTD., Beijing (CN)

(72) Inventor: Chengcheng Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 143 days.

(21) Appl. No.: 18/888,650

(22) Filed: Sep. 18, 2024

(65) Prior Publication Data

US 2025/0298992 A1 Sep. 25, 2025

(30) Foreign Application Priority Data

Mar. 25, 2024 (CN) ......................... 202410346356.4

(51) Int. Cl.
*G06F 40/40* (2020.01)

(52) U.S. Cl.
CPC .................................... *G06F 40/40* (2020.01)

(58) Field of Classification Search
None
See application file for complete search history.

(56) References Cited

U.S. PATENT DOCUMENTS

2024/0256906 A1* 8/2024 Yadav ..................... G06F 40/30
2024/0362497 A1* 10/2024 Grenader ............. G06N 3/0455
2025/0078462 A1* 3/2025 Zhou .................... G06V 10/764
2025/0139088 A1* 5/2025 Weik .................... G06N 3/0455
2025/0245122 A1* 7/2025 Schaefer ................ G06N 3/045
2025/0265481 A1* 8/2025 Ryu ........................ G06N 3/045
2025/0274409 A1* 8/2025 Rieffel .................... H04L 51/02

OTHER PUBLICATIONS

Bharadwaj, Shikhar, and Tushar Kadam. "Github issue classification using bert-style models." Proceedings of the 1st International Workshop on Natural Language-based Software Engineering. 2022. (Year: 2022).*
Kallis, Rafael, et al. "Ticket tagger: Machine learning driven issue classification." 2019 IEEE International Conference on Software Maintenance and Evolution (ICSME). IEEE, 2019. (Year: 2019).*

* cited by examiner

*Primary Examiner* — Douglas Godbold
(74) *Attorney, Agent, or Firm* — BROOKS KUSHMAN P.C.

(57) ABSTRACT

An information processing method, which relates to the field of artificial intelligence, specifically the technical fields of intelligent cloud, deep learning, and large models is disclosed. The information processing method based on a large model includes: receiving, through a unified entry, problem information sent by a user; generating a prompt sentence based on the problem information; invoking the large model based on the prompt sentence to obtain the target type of the problem information output by the large model; creating a target task based on the problem information and the target type; performing problem processing based on the target task using a problem processing object corresponding to the target type, to obtain a problem processing result; wherein different target types correspond to different problem processing objects; and feeding back the problem processing result to the user.

15 Claims, 6 Drawing Sheets

INFORMATION PROCESSING METHOD, APPARATUS, DEVICE, MEDIUM, AND PRODUCT BASED ON LARGE MODEL

CROSS-REFERENCE TO RELATED APPLICATION

The present application claims the priority and benefit of Chinese Patent Application No. 202410346356.4, filed on Mar. 25, 2024, entitled "INFORMATION PROCESSING METHOD, APPARATUS, DEVICE, MEDIUM, AND PRODUCT BASED ON LARGE MODEL". The disclosure of the above application is incorporated herein by reference in its entirety.

TECHNICAL FIELD

The present disclosure relates to the field of artificial intelligence, specifically to the technical fields of cloud platforms, deep learning, and large models, and particularly to an information processing method, apparatus, device, medium, and product based on a large model.

BACKGROUND

The main implementation steps of the current customer service ticket system include: customers submitting problems or requirement to the customer service department via email, phone, online chat, and other channels; customer service representatives receiving the problems submitted by customers, identifying and categorizing the problems to determine their nature and category; customer service representatives creating a ticket in the system based on the identified and categorized problems; after creating the ticket, the system assigns the ticket to the appropriate handler or team according to preset rules; the handler processes the ticket based on its content and priority.

The above scheme is primarily based on manual operations by customer service representatives, which has problems in efficiency and accuracy, affecting user experience.

SUMMARY

The present disclosure provides an information processing method, electronic device and storage medium.

According to one aspect of the present disclosure, an information processing method based on a large model is provided, which includes: receiving, through a unified entry, problem information sent by a user; generating a prompt sentence based on the problem information; invoking the large model based on the prompt sentence to obtain a target type of the problem information output by the large model; creating a target task based on the problem information and the target type; performing problem processing, based on the target task, using a problem processing object corresponding to the target type to obtain a problem processing result; where different target types correspond to different problem processing objects; and feeding back the problem processing result to the user.

According to another aspect of the present disclosure, an electronic device is provided, which includes: at least one processor; and a memory communicatively connected to the at least one processor; where the memory stores instructions executable by the at least one processor, the instructions being executed by the at least one processor to enable the at least one processor to perform any one of the methods according to any one of the above aspects.

According to another aspect of the present disclosure, a non-transitory computer-readable storage medium storing computer instructions is provided, where the computer instructions are configured to cause the computer to perform any one of the methods according to any one of the above aspects.

It should be understood that the content described in this section is not intended to identify key or essential features of the embodiments of the present disclosure, nor is it intended to limit the scope of the present disclosure. Other features of the present disclosure will become apparent from the following description.

BRIEF DESCRIPTION OF THE DRAWINGS

The drawings are provided to better understand the present disclosure and are not intended to limit the present disclosure. Among them.

DETAILED DESCRIPTION OF EMBODIMENTS

The following description, which includes various details of the embodiments of the present disclosure, is provided by way of illustration only. It should be understood that these details are merely illustrative and not restrictive. Therefore, those of ordinary skill in the art should recognize that various changes and modifications can be made to the embodiments described herein without departing from the scope and spirit of the present disclosure. Likewise, for clarity and conciseness, the description omits the description of well-known functions and structures.

In the related art, user-submitted problems are mainly handled by manual processing of customer service representatives, there are problems in efficiency and accuracy.

To improve accuracy and efficiency of information processing, the present disclosure provides the following embodiments.

Figure 1:
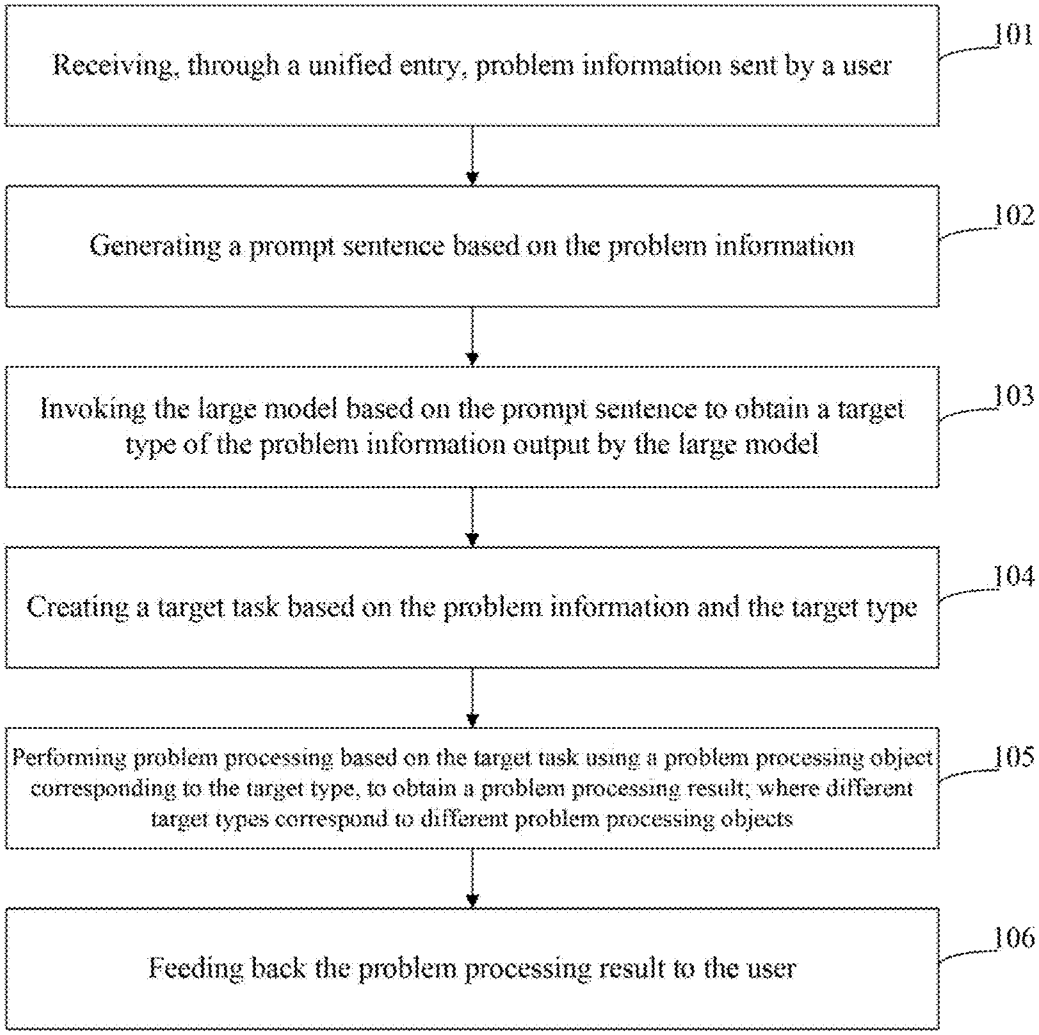
FIG. 1 is a schematic diagram according to a first embodiment of the present disclosure.

FIG. 1 is a schematic diagram according to a first embodiment of the present disclosure. This embodiment provides an information processing method based on a large model, which includes:

101. Receiving, through a unified entry, problem information sent by a user.

102. Generating a prompt sentence based on the problem information.

103. Invoking the large model based on the prompt sentence to obtain a target type of the problem information output by the large model.

104. Creating a target task based on the problem information and the target type.

105. Performing problem processing based on the target task using a problem processing object corresponding to the target type, to obtain a problem processing result; where different target types correspond to different problem processing objects.

106. Feeding back the problem processing result to the user.

The executing entity of this embodiment can be referred to as an information processing system, which can provide a unified entry for external access, and different users can all feed back problems to the system through this unified entry.

Based on different interaction forms, the unified entry can be of various forms. For example, the unified entry may be a unified email address, where different users can send emails to this unified email address. In addition to email forms, users may also interact with the system in other forms, such as online chat forms, message board forms, SMS forms, etc. Therefore, the unified entry can also be other forms of entries, such as online chat entry, message board entry, SMS entry, etc.

Taking the unified entry as a unified email entry as an example, users can send emails to this unified email entry, and the information in the email serves as the problem information.

Problem information can be divided into various types. The specific types can be set according to actual scenarios. Taking a game scenario as an example, the types of problem information may include: activity type, payment type, shopping mall type.

The target type refers to the type of the problem information sent by the current user. For example, if the current user sends a question about an activity, the target type is the activity type.

In the related art, the problem information is usually classified by customer service representatives, but there are certain issues in efficiency and accuracy.

In this embodiment, the target type of the problem information is determined using a large model, which can improve efficiency and accuracy compared to manual methods.

The large model can also be referred to as a Large Language Model (LLM). LLM is a hot topic in the field of artificial intelligence in recent years. LLM is a pre-trained language model that learns rich language knowledge and world knowledge through pre-training on massive text data, thereby achieving amazing results in various natural language processing (NLP), image generation, and other tasks. Applications such as Wenxin Yiyan and ChatGPT are developed based on LLM, which can generate fluent, logical, and creative text content, and even engage in natural dialogues with humans. Specifically, the large model can be a Generative Pre-trained Transformer (GPT) model, an Enhanced Representation through Knowledge Integration (ERNIE) model, etc.

When using the large model, a prompt sentence may be input to the large model, and the large model obtains an output based on this prompt sentence. Specifically in this embodiment, the output of the large model is the target type of the problem information.

Specifically, the interface between the system and the large model can be pre-configured, and the large model can be invoked through this interface to obtain the target type through the large model.

The target task refers to the task for processing the problem information, which may specifically be a target ticket or ticket.

After creating the target task, the target task may be assigned to the corresponding problem processing object for processing. Different target types correspond to different problem processing objects.

Taking the game scenario as an example, multiple types of problem processing objects can be pre-configured, each type of problem processing object being used to process one type of problem information. For example, multiple types of problem processing objects can be referred to as activity ticket module, payment ticket module, shopping mall ticket module. If the target type is the activity type, the target ticket is assigned to the activity ticket module for processing.

The multiple types of problem processing objects can be provided by the information processing system; or, they can also be provided by systems outside the information processing system, in which case the problem processing object corresponding to the target type can be invoked through a pre-configured interface for problem processing. This way, by independent development, the advantages of different systems can be fully utilized to improve the problem processing effect.

After the problem processing object obtains a problem processing result, the information processing system feeds back the problem processing result to the user, such as sending a feedback email to the user.

In this embodiment, using the large model to determine the target type of the problem information, and creating the target task based on the problem information and the target type, and assigning the target task to the problem processing object for processing, can automatically determine the target type, and automatically generate and distribute the target task, which can improve the efficiency and accuracy of information processing compared to manual processing.

To better understand the embodiments of the present disclosure, the application scenarios to which the embodiments of the present disclosure can be applied will be described.

Figure 2:
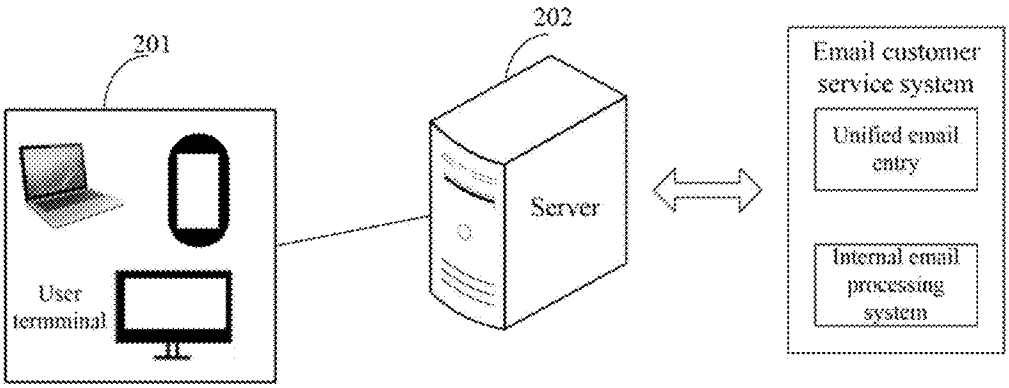
FIG. 2 is a schematic diagram of an application scenario for implementing an embodiment of the present disclosure.

FIG. 2 is a schematic diagram of an application scenario for implementing an embodiment of the present disclosure. This scenario includes: user terminal 201 and server 202. The user terminal 201 can include: personal computer (PC), mobile devices (such as mobile phones), tablet computers, notebook computers, smart wearable devices, etc. The server 202 can be a cloud server or a local server. The user terminal 201 and the server 202 can communicate using a communication network, which may include wired networks and/or wireless networks.

The information processing system can be deployed on the server 202. In this embodiment, taking the interaction form as email as an example, the information processing system can be referred to as an email customer service system. As shown in FIG. 2, the email customer service system may provide a unified email entry, such as a preset email address. Different users may send emails to this unified email address to feedback issues. After receiving the email sent by the user, the email customer service system processes the email using an internal email processing system to resolve the problems feedback by the user, and after obtaining the problem processing result, feeds back the problem processing result to the user via the unified email entry.

Figure 3:
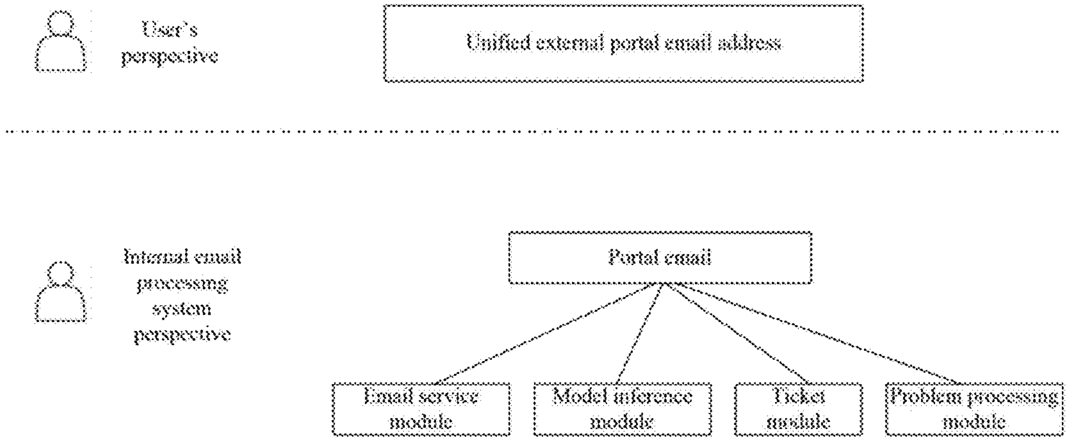
FIG. 3 is a schematic diagram of a structural composition from different perspectives according to an embodiment of the present disclosure.

FIG. 3 is a schematic diagram of a structural composition from different perspectives according to an embodiment of the present disclosure. As shown in FIG. 3, from the user's perspective, the email customer service system provides a unified entry, which is a unified external portal email address. From the internal system's perspective, the internal email processing system can specifically include: email service module, model inference module, ticket module, and problem processing module. The email service module is mainly used to obtain a problem email from the portal email, create a prompt sentence based on the problem email, and after obtaining the problem processing result, send the problem processing result to the user via a feedback email. The model inference module is mainly used to invoke the large model according to the prompt sentence, and use the large model to obtain the target type of the problem email. The ticket module is mainly used to create a target ticket based on the problem email and the target type. The problem processing module is mainly used to process the problem based on the target ticket to obtain the problem processing result.

Figure 4:
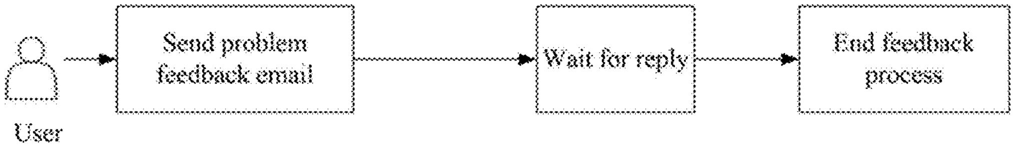
FIG. 4 is a schematic diagram of an execution process from a user's perspective according to an embodiment of the present disclosure.

Further, referring to FIG. 4, FIG. 4 is a schematic diagram of an execution process from a user's perspective according to an embodiment of the present disclosure. As shown in FIG. 4, a user sends a problem feedback email. Specifically, the user sends an email to the unified external portal email address, which contains the problem feedback by the user; then, the user waits for a reply; after receiving the feedback email from the portal email address, the feedback process ends. The user can repeat the process of sending an email, waiting for a feedback, and receiving a feedback email multiple times according to actual needs.

Figure 5:
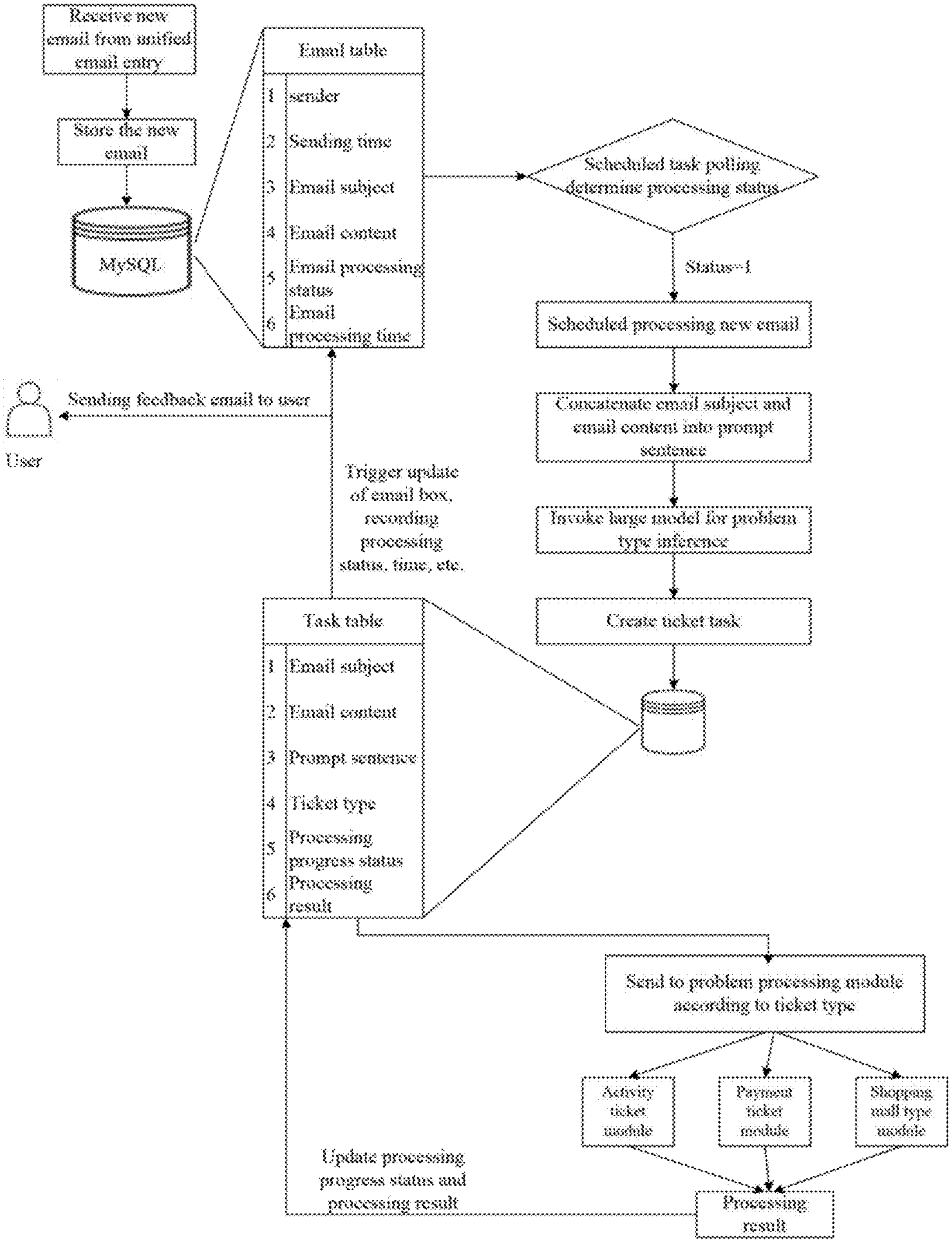
FIG. 5 is a schematic diagram of an execution process from an internal system's perspective according to an embodiment of the present disclosure.

Referring to FIG. 5, FIG. 5 is a schematic diagram of an execution process from the internal system's perspective according to an embodiment of the present disclosure. As shown in FIG. 5, after the unified email entry (such as the portal email address) receives a new email, the email service module may store the new email in a database, such as a MySQL database. MySQL is a relational database. When storing, the email content may be stored in a table format, which may be called an email table. The email table may specifically include the following fields: sender, sending time, email subject, email content, email processing status, email processing time, etc.

The email service module may also set a scheduled task to poll the email content of each email based on the scheduled task, obtain the email processing status, where the email processing status is initially set to unprocessed, such as using 1 to indicate unprocessed. For unprocessed emails, that is, when the status=1, the new email is processed at regular intervals based on the scheduled task. The processing process may include: concatenating the email subject and email content into a prompt sentence (prompt) and sending it to the model inference module.

After receiving the prompt sentence, the model inference module invokes the large model for problem type inference, that is, using the large model to determine the target type of the email based on the prompt sentence. After obtaining the target type output by the large model, the model inference module sends the target type to the ticket module.

The ticket module creates a ticket task based on the target type and problem information. The ticket task can be stored in the form of a task table, with specific fields including: email subject, email content, prompt sentence, ticket type (target type), processing progress status, and processing result. Among them, the email subject and email content may be obtained from the email content, the prompt sentence may be obtained from the email service module, the ticket type is the target type, which may be obtained from the model inference module. The initial values of the processing progress status and the processing result are set, for example, both are set to empty.

After the ticket module creates the ticket task, it may send the ticket task to the corresponding type of problem processing module. For example, if the target type is the activity type, it is sent to the activity ticket module; or, if the target type is the payment type, it is sent to the payment ticket module; or, if the target type is the shopping mall type, it is sent to the shopping mall ticket module.

The problem processing module, after receiving the ticket task, processes it to obtain the processing result and feeds it back to the ticket module.

The ticket module updates the processing progress status and processing result in the task table; and triggers the email service module to update the email table, recording the email processing status, email processing time, etc.

After obtaining the processing result, the email service module sends a feedback email to the user, which contains the problem processing result.

In combination with the above application scenarios, the present disclosure also provides the following embodiment.

Figure 6:
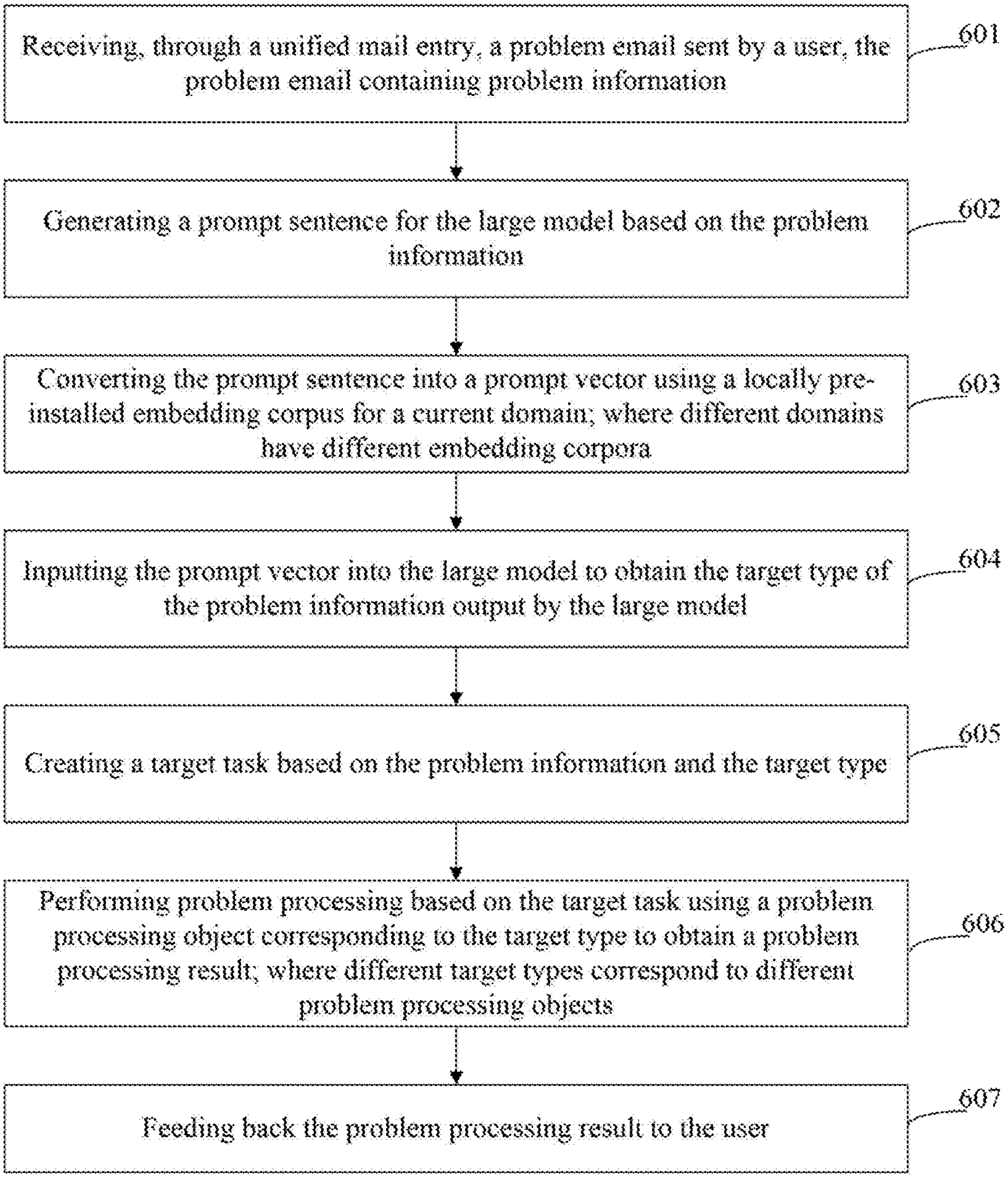
FIG. 6 is a schematic diagram according to a second embodiment of the present disclosure.

FIG. 6 is a schematic diagram according to a second embodiment of the present disclosure. This embodiment provides an information processing method based on a large model, which includes:

601. Receiving, through a unified mail entry, a problem email sent by a user, the problem email containing problem information.

In this embodiment, the user interacts with the system using email, which can solve problems such as difficulty in voice recognition in voice interaction. In addition, compared to other text forms, the email form is more convenient for users, thus facilitating users to reflect problems.

602. Generating a prompt sentence for the large model based on the problem information.

For example, the problem information includes: an email subject and email content, concatenating the email subject and email content into a prompt sentence.

In this embodiment, concatenating the email subject and email content into a prompt sentence can generate the prompt sentence simply and efficiently.

603. Converting the prompt sentence into a prompt vector using a locally pre-installed embedding corpus for a current domain; where different domains have different embedding corpora.

Specifically, the embedding corpus may record the correspondence between words and vectors. After obtaining the prompt sentence, the prompt sentence may be segmented to obtain segmented words, and then the vector corresponding to the word is queried in the embedding corpus as the prompt vector.

The embedding corpus is a specialized corpus for the current domain. For example, if the current domain is the game domain, the game domain's embedding corpus is used; or, if the current domain is the government affairs domain, the government affairs domain's embedding corpus is used.

Different domains have different embedding corpora. Specifically, embedding corpora for various domains may be created in advance, and the embedding corpus for the current domain may be configured locally based on the current scenario.

In this embodiment, by using the locally pre-installed embedding corpus for the current domain, compared to a general corpus, a more accurate embedding corpus is used, thereby obtaining a more accurate prompt vector, improving processing efficiency and accuracy.

604. Inputting the prompt vector into the large model to obtain the target type of the problem information output by the large model.

For example, through a preset interface, the prompt vector is input into the large model. After processing the input prompt vector, the large model outputs the target type of the problem information.

605. Creating a target task based on the problem information and the target type.

606. Performing problem processing based on the target task using a problem processing object corresponding to the target type to obtain a problem processing result; where different target types correspond to different problem processing objects.

607. Feeding back the problem processing result to the user.

Specifically, after obtaining the target type from the large model, the target task can be automatically created based on the problem information and the target type.

In some embodiments, a task template corresponding to the target type may be obtained; where different target types correspond to different task templates; the target task is created based on the problem information and the task template.

Specifically, the task template is pre-configured, and different types may be configured with different task templates. The task template may record the field corresponding to the task, such as the subject, content, etc. Afterwards, the problem information may be filled into the corresponding field, such as filling the specific content of the email subject into the subject field, and filling the specific email content into the content field, etc.

In this embodiment, by having different target types correspond to different task templates, more flexible target tasks are generated, better meeting user needs and enhancing user experience.

In some embodiments, a feedback template corresponding to the target type is obtained; where different target types correspond to different feedback templates; feedback information is created based on the problem processing result and the feedback template; the feedback information is sent to the user.

Specifically, the feedback information may also be generated based on the feedback template, so that different types of target tasks correspond to different forms of feedback information, further enhancing user experience.

Figure 7:
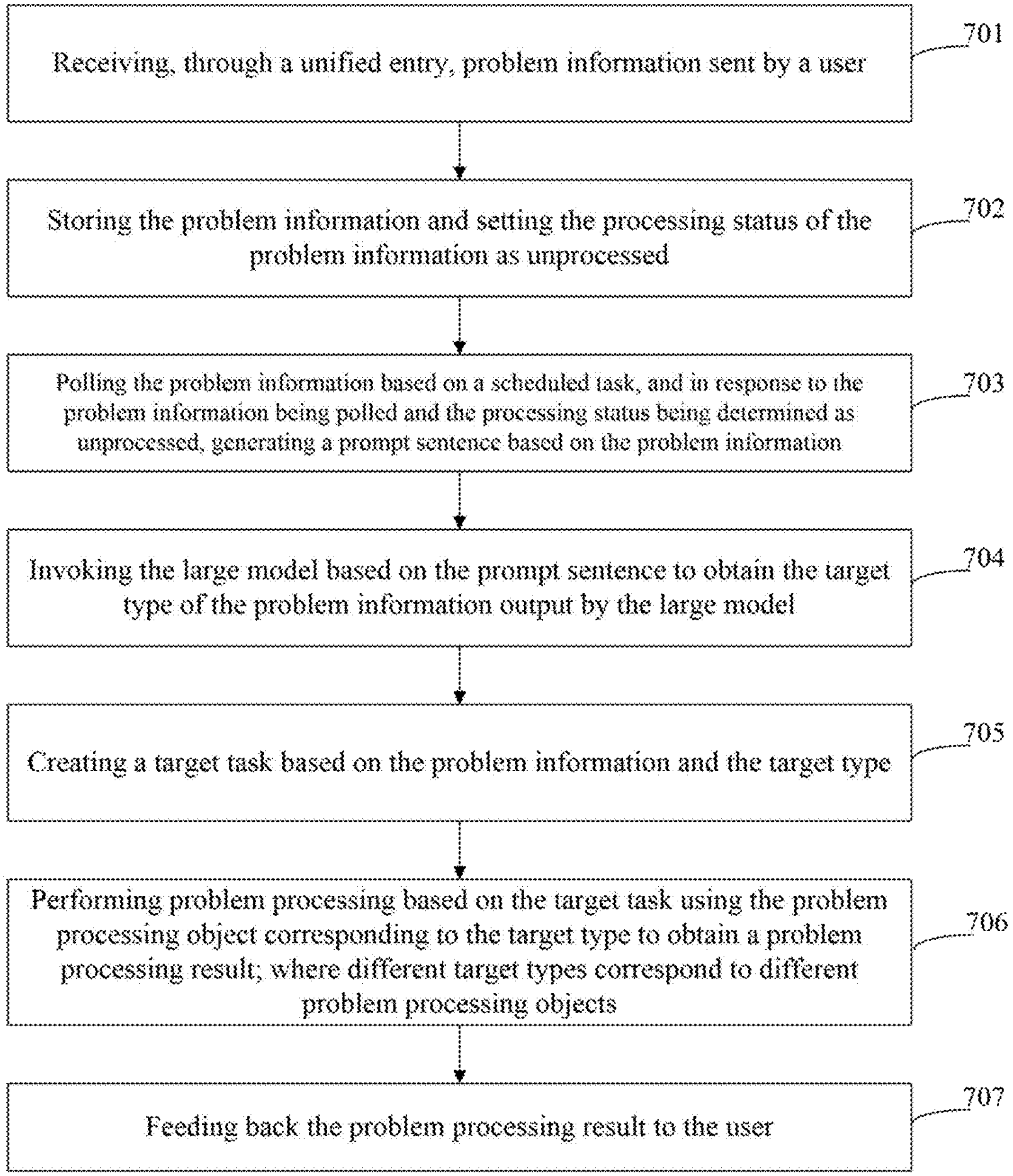
FIG. 7 is a schematic diagram according to a third embodiment of the present disclosure.

FIG. 7 is a schematic diagram according to a third embodiment of the present disclosure. This embodiment provides an information processing method based on a large model, which includes:

701. Receiving, through a unified entry, problem information sent by a user.

702. Storing the problem information and setting the processing status of the problem information as unprocessed.

703. Polling the problem information based on a scheduled task, and in response to the problem information being polled and the processing status being determined as unprocessed, generating a prompt sentence based on the problem information.

Taking email as an example, for instance, after receiving an email, the email is stored in a database and the initial status is set as unprocessed. The system also starts a scheduled task, which is used to periodically poll each email in the database based on a set period to obtain the processing status of each email. For a particular email, if its processing status is unprocessed, a prompt sentence is generated based on the problem information for subsequent processing.

704. Invoking the large model based on the prompt sentence to obtain the target type of the problem information output by the large model.

705. Creating a target task based on the problem information and the target type.

706. Performing problem processing based on the target task using the problem processing object corresponding to the target type to obtain a problem processing result; where different target types correspond to different problem processing objects.

707. Feeding back the problem processing result to the user.

In this embodiment, polling the problem information based on a scheduled task may handle the problem information in a timely manner.

In some embodiments, after the scheduled task polls the unprocessed problem information, it may also perform:

In response to the problem information being polled and the processing status being determined as unprocessed, storing the problem information into a message queue;

In the case that the problem information includes multiple items, using multiple executors to concurrently retrieve different problem information from the message queue and concurrently generate the prompt sentences based on the different problem information.

Specifically, the executor is the subject for processing the problem information, such as a process, thread, or coroutine, etc.

The number of executors may be dynamically adjusted according to the number of problem information items. For example, initially, one executor is started. When the number of problem information items stored in the message queue reaches a first threshold, two executors are started. Similarly, when the number of problem information items stored in the message queue is larger, more executors may be started.

Assuming the number of problem information items in the message queue is M, and the number of executors is N, both M and N are positive integers, and generally N is less than or equal to M, then N executors can concurrently retrieve different problem information from the M problem information items. Assuming two executors process two problem information items, the first executor may retrieve the first problem information, generate a prompt sentence based on the first problem information, invoke the large model to obtain the target type, and invoke the corresponding problem processing object based on the target type to process the problem; the second executor may retrieve the second problem information, generate a prompt sentence based on the second problem information, invoke the large model to obtain the target type, and invoke the corresponding problem processing object based on the target type to process the problem.

The above two executors may concurrently retrieve problem information and perform subsequent processing in parallel.

Additionally, each executor can be further divided into multiple sub-executors, which can also process different steps in parallel. For example, if the executor is a thread and the sub-executor is a coroutine, then for a particular thread, the first coroutine corresponding to the thread can retrieve the first problem information from the message queue, the second coroutine corresponding to the thread can generate a prompt sentence based on the already retrieved second problem information, and the third coroutine corresponding to the thread can perform embedding processing on the prompt sentence corresponding to the already generated third problem information to obtain an embedding vector. The first coroutine, second coroutine, and third coroutine are processed in parallel.

Additionally, for a particular problem information, if it is not successfully processed by a certain executor, specifically, the processing status of the problem information is not updated to processed within a preset duration, it can be considered that the problem information was not successfully processed. The executor can then store the problem information back into the message queue. Afterwards, this problem information can be re-read and processed by the same executor or another executor, thereby improving the processing success rate. Furthermore, if the number of times a particular problem information has not been successfully processed reaches a preset number, for example, setting the initial value of the number of times the problem information has not been successfully processed to 0, and after it is stored back into the message queue, the number of times it has not been successfully processed increases by 1, and after the updated number of times it has not been successfully processed reaches the preset number, the problem information can be discarded and no longer processed, such as deleting the problem information from the message queue, thus avoiding wasting resources.

In this embodiment, using multiple executors to concurrently retrieve different problem information from the message queue and concurrently generate the prompt sentence based on the different problem information, through parallel execution, can improve processing efficiency.

Figure 8:
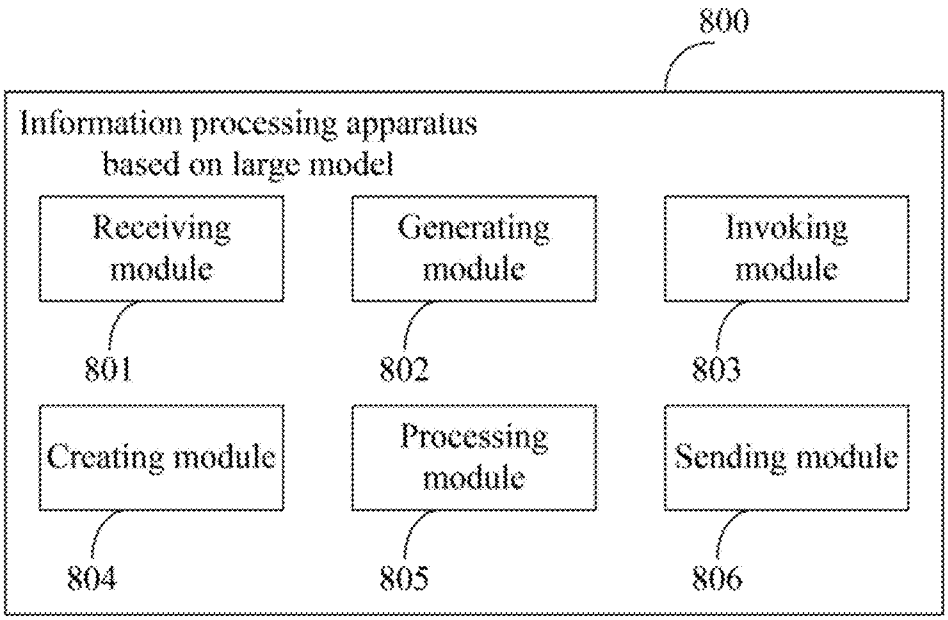
FIG. 8 is a schematic diagram according to a fourth embodiment of the present disclosure.

FIG. 8 is a schematic diagram according to a fourth embodiment of the present disclosure. This embodiment provides an information processing apparatus based on a large model. As shown in FIG. 8, the apparatus 800 includes: receiving module 801, generating module 802, invoking module 803, creating module 804, processing module 805, and sending module 806.

The receiving module 801 is configured to receive, through a unified entry, problem information sent by a user; the generating module 802 is configured to generate a prompt sentence based on the problem information; the invoking module 803 is configured to invoke the large model based on the prompt sentence to obtain a target type of the problem information output by the large model; the creating module 804 is configured to create a target task based on the problem information and the target type; the processing module 805 is configured to perform problem processing, based on the target task using a problem processing object corresponding to the target type to obtain a problem processing result; where different target types correspond to different problem processing objects; and the sending module 806 is configured to feed back the problem processing result to the user.

In this embodiment, using the large model to determine the target type of the problem information, and creating the target task based on the problem information and the target type, and assigning the target task to the problem processing object for processing, can automatically determine the target type, and automatically generate and distribute the target task, which can improve the efficiency and accuracy of information processing compared to manual processing.

In some embodiments, the receiving module 801 is further configured to:

Receive, through a unified mail entry, a problem email sent by a user, the problem email containing problem information.

In this embodiment, the user interacts with the system using email, which can solve problems such as difficulty in voice recognition in voice interaction. In addition, compared to other text forms, the email form is more convenient for users, thus facilitating users to reflect issues.

In some embodiments, the problem information includes: an email subject and email content;

The generating module 802 is further configured to:

Concatenate the email subject and the email content into a prompt sentence.

In this embodiment, concatenating the email subject and email content into a prompt sentence can generate the prompt sentence simply and efficiently.

In some embodiments, the apparatus further includes:

A storage module configured to store the problem information and set the processing status of the problem information as unprocessed;

The generating module 802 is further configured to:

Poll the problem information based on a scheduled task; and

Generate the prompt sentence based on the problem information in response to the problem information being polled and the processing status being determined as unprocessed.

In this embodiment, polling the problem information based on a scheduled task can handle the problem information in a timely manner.

In some embodiments, the generating module 802 is further configured to:

Store the problem information into a message queue in response to the problem information being polled and the processing status being determined as unprocessed; and In the case that the problem information includes multiple items, use multiple executors to concurrently retrieve different problem information from the message queue and concurrently generate the prompt sentences based on the different problem information.

In this embodiment, using multiple executors to concurrently retrieve different problem information from the message queue and concurrently generate the prompt sentence based on the different problem information, through parallel execution, can improve processing efficiency.

In some embodiments, the invoking module 803 is further configured to:

Convert the prompt sentence into a prompt vector using a locally pre-installed embedding corpus for a current domain; where different domains have different embedding corpora; and Input the prompt vector into the large model to obtain the target type of the problem information output by the large model.

In this embodiment, by using the locally pre-installed embedding corpus for the current domain, compared to a general corpus, a more accurate embedding corpus can be used, thereby obtaining a more accurate prompt vector, improving processing efficiency and accuracy.

In some embodiments, the creating module 804 is further configured to:

Obtain a task template corresponding to the target type; where different target types correspond to different task templates; and Create the target task based on the problem information and the task template.

In this embodiment, by having different target types correspond to different task templates, more flexible target tasks can be generated, better meeting user needs and enhancing user experience.

In some embodiments, the sending module 806 is further configured to:

Obtain a feedback template corresponding to the target type; where different target types correspond to different feedback templates;

Create feedback information based on the problem processing result and the feedback template;

Send the feedback information to the user.

The feedback information can also be generated based on the feedback template, so that different types of target tasks can correspond to different forms of feedback information, further enhancing user experience.

It is to be understood that in the embodiments of the present disclosure, the same or similar contents in different embodiments can be referred to each other.

It is to be understood that in the embodiments of the present disclosure, "first," "second," etc., are only used for differentiation and do not indicate the level of importance or the order of sequence.

It is to be understood that the order of steps involved in the process, unless otherwise specified, indicates that the temporal relationship between these steps is not limited.

In the technical solutions of the present disclosure, the collection, storage, use, processing, transmission, provision, and disclosure of user personal information are in compliance with relevant laws and regulations and do not violate public order and good customs.

According to an embodiment of the present disclosure, the present disclosure also provides an electronic device, a readable storage medium, and a computer program product.

Figure 9:
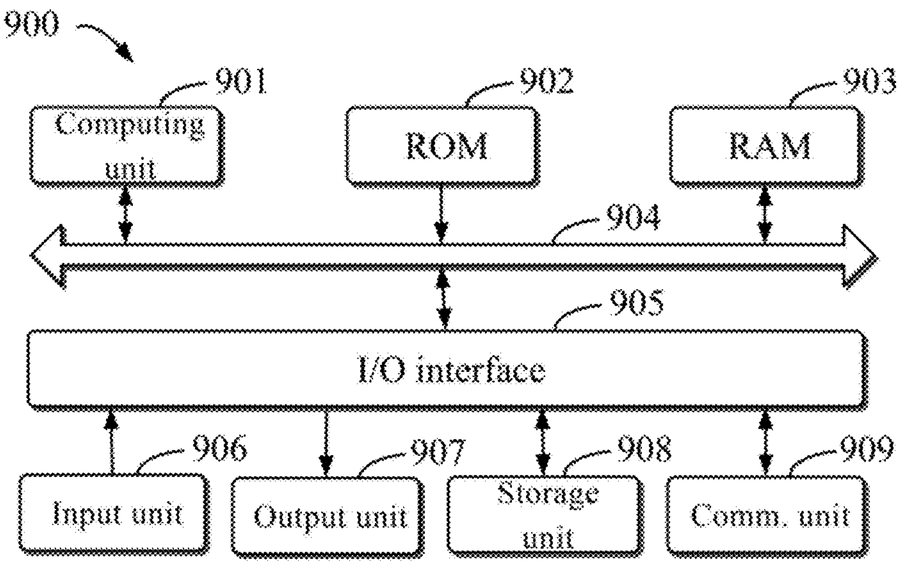
FIG. 9 is a schematic diagram of an electronic device for implementing a information processing method based on a large model according to an embodiment of the present disclosure.

FIG. 9 shows a schematic block diagram of an example electronic device 900 that can be used to implement an embodiment of the present disclosure. The electronic device 900 is intended to represent various forms of digital computers, such as laptop computers, desktop computers, workstations, servers, blade servers, mainframe computers, and other suitable computers. The electronic device can also represent various forms of mobile devices, such as personal digital assistants, cellular phones, smartphones, wearable devices, and other similar computing devices. The components shown in this article, their connections and relationships, and their functions are merely examples and are not intended to limit the implementation of the present disclosure as described and/or claimed in this article.

As shown in FIG. 9, the electronic device 900 includes a computing unit 901, which can perform various appropriate actions and processing according to the computer program stored in the read-only memory (ROM) 902 or the computer program loaded from the storage unit 908 into the random access memory (RAM) 903. Various programs and data required for the operation of the electronic device 900 are also stored in the RAM 903. The computing unit 901, ROM 902, and RAM 903 are interconnected via a bus 904. An input/output (I/O) interface 905 is also connected to the bus 904.

Multiple components of the electronic device 900 are connected to the I/O interface 905, including: an input unit 906, such as a keyboard, mouse, etc.; an output unit 907, such as various types of displays, speakers, etc.; a storage unit 908, such as disks, optical discs, etc.; and a communication unit 909, such as a network card, modem, wireless communication transceiver, etc. The communication unit 909 allows the electronic device 900 to exchange information/data with other devices via computer networks such as the Internet and/or various telecommunications networks.

The computing unit 901 can be various general-purpose and/or special-purpose processing components with processing and computing capabilities. Examples of the computing unit 901 include, but are not limited to, a central processing unit (CPU), a graphics processing unit (GPU), various special-purpose artificial intelligence (AI) computing chips, various computing units running machine learning model algorithms, a digital signal processor (DSP), and any appropriate processor, controller, microcontroller, etc. The computing unit 901 executes the various methods and processes described above, such as the information processing method based on a large model. For example, in some embodiments, the information processing method based on a large model can be implemented as a computer software program tangibly contained in a machine-readable medium, such as the storage unit 908. In some embodiments, part or all of the computer program can be loaded and/or installed on the electronic device 900 via the ROM 902 and/or the communication unit 909. When the computer program is loaded into the RAM 903 and executed by the computing unit 901, one or more steps of the information processing method based on a large model described above can be executed. Alternatively, in other embodiments, the computing unit 901 can be configured to perform the information processing method based on a large model by any other suitable means, such as through firmware.

Various embodiments of the systems and techniques described above can be implemented in digital electronic circuitry, integrated circuitry, field-programmable gate arrays (FPGAs), application-specific integrated circuits (ASICs), application-specific standard products (ASSPs), system-on-a-chip (SOC) devices, complex programmable logic devices (CPLDs), computer hardware, firmware, software, and/or combinations thereof. These various embodiments may include: being implemented in one or more computer programs, which can be executed and/or interpreted on a programmable system including at least one programmable processor, which may be a special-purpose or general-purpose programmable processor, receiving data and instructions from a storage system, at least one input device, and at least one output device, and transmitting data and instructions to the storage system, the at least one input device, and the at least one output device.

Program code for implementing the methods of the present disclosure can be written in any combination of one or more programming languages. This program code can be provided to a processor or controller of a general-purpose computer, special-purpose computer, or other programmable data processing apparatus, such that the program code, when executed by the processor or controller, causes the functions/operations specified in the flowcharts and/or block diagrams to be implemented. The program code can be fully executed on a machine, partially executed on a machine, partially executed on a machine and partially on a remote machine, or fully executed on a remote machine or server.

In the context of the present disclosure, a machine-readable medium may be a tangible medium that can contain or store a program for use by or in connection with an instruction execution system, apparatus, or device. A machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

To provide interaction with a user, the systems and techniques described here can be implemented on a computer having: a display device for displaying information to the user (e.g., a CRT (cathode ray tube) or LCD (liquid crystal display) monitor); and a keyboard and a pointing device (e.g., a mouse or a trackball), by which the user can provide input to the computer. Other types of devices can also be used to provide interaction with the user; for example, feedback provided to the user can be any form of sensory feedback (e.g., visual feedback, auditory feedback, or tactile feedback); and input from the user can be received in any form (including acoustic, speech, or tactile input).

The systems and techniques described here can be implemented in a computing system that includes a back-end component (e.g., as a data server), or a middleware component (e.g., an application server), or a front-end component (e.g., a user computer with a graphical user interface or a web browser through which a user can interact with the implementation of the systems and techniques described here), or any combination of such back-end, middleware, or front-end components. The components of the system can be interconnected by any form or medium of digital data communication (e.g., a communication network). Examples of communication networks include a local area network (LAN), a wide area network (WAN), and the Internet.

A computer system can include clients and servers. Clients and servers are generally remote from each other and typically interact through a communication network. The relationship of client and server arises by virtue of computer programs running on the respective computers and having a client-server relationship to each other. A server can be a cloud server, also known as a cloud computing server or cloud host, which is a host product in the cloud computing service system, addressing the shortcomings of traditional physical hosts and VPS services ("Virtual Private Server," or simply "VPS") in terms of difficult management and weak business scalability. The server can also be a server of a distributed system, or a server combined with blockchain technology.

It should be understood that various forms of processes shown above can be used, with steps reordered, added, or deleted. For example, the steps described in the present disclosure can be executed in parallel, sequentially, or in different orders, as long as the desired results of the technical solutions disclosed in the present disclosure can be achieved, and this is not restricted herein.

As used in the description herein and throughout the claims that follow, "a", "an", and "the" includes plural references unless the context clearly dictates otherwise.

The above specific embodiments do not constitute a limitation on the scope of protection of the present disclosure. Those skilled in the art should understand that various modifications, combinations, sub-combinations, and substitutions can be made according to design requirements and other factors. Any modifications, equivalent substitutions, and improvements made within the spirit and principle of the present disclosure shall be included within the scope of protection of the present disclosure.

What is claimed is:

1. An information processing method based on a large model, comprising:
- receiving, through a unified entry, problem information sent by a user;
- storing the problem information and setting a processing status of the problem information as unprocessed;
- polling the problem information based on a scheduled task;
- generating a prompt sentence based on the problem information in response to the problem information being polled and the processing status being determined as unprocessed, comprising: storing the problem information into a message queue in response to the problem information being polled and the processing status being determined as unprocessed; and in the case that the problem information comprises multiple items, using multiple executors to concurrently retrieve different problem information from the message queue and concurrently generate the prompt sentences based on the different problem information;
- invoking the large model based on the prompt sentence to obtain a target type of the problem information output by the large model;
- creating a target task based on the problem information and the target type;
- performing problem processing based on the target task using a problem processing object corresponding to the target type, to obtain a problem processing result; wherein different target types correspond to different problem processing objects; and
- feeding back the problem processing result to the user.

2. The method according to claim 1, wherein receiving through the unified entry the problem information sent by the user comprises:
- receiving, through a unified mail entry, a problem email sent by a user, the problem email containing problem information.

3. The method according to claim 2, wherein
- the problem information comprises: an email subject and email content; and
- wherein generating the prompt sentence based on the problem information comprises:
- concatenating the email subject and the email content into a prompt sentence.

4. The method according to claim 1, wherein invoking the large model based on the prompt sentence to obtain the target type of the problem information output by the large model comprises:
- converting the prompt sentence into a prompt vector using a locally pre-installed embedding corpus for a current domain; wherein different domains have different embedding corpora; and
- inputting the prompt vector into the large model to obtain the target type of the problem information output by the large model.

5. The method according to claim 1, wherein creating the target task based on the problem information and the target type comprises:
- obtaining a task template corresponding to the target type; wherein different target types correspond to different task templates; and creating the target task based on the problem information and the task template.

6. The method according to claim 1, wherein feeding back the problem processing result to the user comprises:

obtaining a feedback template corresponding to the target type; wherein different target types correspond to different feedback templates;

creating feedback information based on the problem processing result and the feedback template; and sending the feedback information to the user.

7. An electronic device, comprising:

at least one processor; and a memory communicatively connected to the at least one processor; wherein the memory stores instructions executable by the at least one processor, the instructions being executed by the at least one processor to enable the at least one processor to perform an information processing method based on a large model comprising:

receiving, through a unified entry, problem information sent by a user;

storing the problem information and setting a processing status of the problem information as unprocessed;

polling the problem information based on a scheduled task;

generating a prompt sentence based on the problem information in response to the problem information being polled and the processing status being determined as unprocessed, comprising: storing the problem information into a message queue in response to the problem information being polled and the processing status being determined as unprocessed; and in the case that the problem information comprises multiple items, using multiple executors to concurrently retrieve different problem information from the message queue and concurrently generate the prompt sentences based on the different problem information;

invoking the large model based on the prompt sentence to obtain a target type of the problem information output by the large model;

creating a target task based on the problem information and the target type;

performing problem processing based on the target task using a problem processing object corresponding to the target type, to obtain a problem processing result; wherein different target types correspond to different problem processing objects; and feeding back the problem processing result to the user.

8. The electronic device according to claim 7, wherein receiving through the unified entry the problem information sent by the user comprises:

receiving, through a unified mail entry, a problem email sent by a user, the problem email containing problem information.

9. The electronic device according to claim 8, wherein the problem information comprises: an email subject and email content; and wherein generating the prompt sentence based on the problem information comprises:

concatenating the email subject and the email content into a prompt sentence.

10. The electronic device according to claim 7, wherein invoking the large model based on the prompt sentence to obtain the target type of the problem information output by the large model comprises:

converting the prompt sentence into a prompt vector using a locally pre-installed embedding corpus for a current domain; wherein different domains have different embedding corpora; and inputting the prompt vector into the large model to obtain the target type of the problem information output by the large model.

11. The electronic device according to claim 7, wherein creating the target task based on the problem information and the target type comprises:

obtaining a task template corresponding to the target type; wherein different target types correspond to different task templates; and creating the target task based on the problem information and the task template.

12. The electronic device according to claim 7, wherein feeding back the problem processing result to the user comprises:

obtaining a feedback template corresponding to the target type; wherein different target types correspond to different feedback templates;

creating feedback information based on the problem processing result and the feedback template; and sending the feedback information to the user.

13. A non-transitory computer-readable storage medium storing computer instructions, wherein the computer instructions are configured to cause the computer to perform an information processing method based on a large model comprising:

receiving, through a unified entry, problem information sent by a user;

storing the problem information and setting a processing status of the problem information as unprocessed;

polling the problem information based on a scheduled task;

generating a prompt sentence based on the problem information in response to the problem information being polled and the processing status being determined as unprocessed, comprising: storing the problem information into a message queue in response to the problem information being polled and the processing status being determined as unprocessed; and in the case that the problem information comprises multiple items, using multiple executors to concurrently retrieve different problem information from the message queue and concurrently generate the prompt sentences based on the different problem information;

invoking the large model based on the prompt sentence to obtain a target type of the problem information output by the large model;

creating a target task based on the problem information and the target type;

performing problem processing based on the target task using a problem processing object corresponding to the target type, to obtain a problem processing result; wherein different target types correspond to different problem processing objects; and feeding back the problem processing result to the user.

14. The storage medium according to claim 13, wherein receiving through the unified entry the problem information sent by the user comprises:

receiving, through a unified mail entry, a problem email sent by a user, the problem email containing problem information.

15. The storage medium according to claim 13, wherein invoking the large model based on the prompt sentence to obtain the target type of the problem information output by the large model comprises:

converting the prompt sentence into a prompt vector using a locally pre-installed embedding corpus for a current domain; wherein different domains have different embedding corpora; and inputting the prompt vector into the large model to obtain the target type of the problem information output by the large model.

* * * * *